(12) United States Patent
Schulz et al.

(10) Patent No.: US 9,639,174 B2
(45) Date of Patent: May 2, 2017

(54) MOBILE DEVICE DISPLAY CONTENT BASED ON SHAKING THE DEVICE

(71) Applicant: PAYPAL, INC., San Jose, CA (US)

(72) Inventors: Egan Schulz, San Jose, CA (US); Peter Chu, Santa Clara, CA (US); Max Edward Metral, Brookline, MA (US)

(73) Assignee: PAYPAL, INC., San Jose, CA (US)

( * ) Notice: Subject to any disclaimer, the term of this patent is extended or adjusted under 35 U.S.C. 154(b) by 112 days.

(21) Appl. No.: 13/791,697

(22) Filed: Mar. 8, 2013

(65) Prior Publication Data

US 2013/0187850 A1 Jul. 25, 2013

Related U.S. Application Data

(60) Provisional application No. 61/608,838, filed on Mar. 9, 2012.

(51) Int. Cl.
| | |
|---|---|
| G06F 3/048 | (2013.01) |
| G06F 3/03 | (2006.01) |
| G06F 1/16 | (2006.01) |
| G06F 3/01 | (2006.01) |

(52) U.S. Cl.
CPC .............. G06F 3/03 (2013.01); G06F 1/1694 (2013.01); G06F 3/017 (2013.01)

(58) Field of Classification Search
CPC ...... G06F 3/017; G06F 3/0346; G06F 1/1694; H04M 2250/12
USPC .................................. 455/410, 411; 715/863
See application file for complete search history.

(56) References Cited

U.S. PATENT DOCUMENTS

| | | | | |
|---|---|---|---|---|
| 6,012,565 | A  * | 1/2000  | Mazur | 194/207 |
| 7,865,829 | B1 * | 1/2011  | Goldfield | G06F 9/4446 |
| | | | | 715/708 |
| 7,991,388 | B1 * | 8/2011  | Becker et al. | 455/411 |
| 8,902,154 | B1 * | 12/2014 | Kahn | G06F 3/017 |
| | | | | 345/156 |
| 2005/0253807 | A1* | 11/2005 | Hohmann et al. | 345/156 |
| 2009/0303204 | A1* | 12/2009 | Nasiri | A63F 13/06 |
| | | | | 345/184 |
| 2011/0181504 | A1* | 7/2011  | Ishikawa | G06F 3/0237 |
| | | | | 345/156 |
| 2012/0329529 | A1* | 12/2012 | van der Raadt | G06F 1/1694 |
| | | | | 455/566 |

OTHER PUBLICATIONS

Azim Toktosunov, MedCoach: Free Medication Manager [iPhone App], Jul. 6, 2011, makeuseof, pp. 1-4.*
Addintools, Where is Help Button in Microsoft Word 2007 and 2010?, Jun. 10, 2011, Addintools, pp. 1-4.*

* cited by examiner

*Primary Examiner* — Jeffrey A Gaffin
*Assistant Examiner* — Justin Lee
(74) *Attorney, Agent, or Firm* — Haynes and Boone, LLP

(57) ABSTRACT

When a user shakes a mobile device, such as a smart phone, new content is shown on the display of the mobile device. In one embodiment, the content depends on the page or location the user is currently on within the mobile app or mobile browser page and can depend also on the history or experience level of the user.

17 Claims, 6 Drawing Sheets

FIG. 2C

```
..ooll CELL PHONE 🛜      1:14 PM              🔋
 ( Done )         Joe Smith                   ⟩⟩

[avatar]      Balance $54.19 USD
                       Last updated 1:07 PM

Recent Activity                    ( Details )
  ┌─────────────────────────────────────────┐
  │ My profile message                      │
  │ This has a second and even a            │
  │ third line.                             │
  └─────────────────────────────────────────┘

Rose Rangel        (?)        – $1,500.00  ⟩⟩
  Completed                    Dec 20, 2011

Incentive Logic Inc           + $5.00      ⟩⟩
  Completed                    Dec 19, 2011

[Account]     [Send]    [Request]    [Local]
```

FIG. 2D

```
..ooll CELL PHONE 3G    4:20 PM               🔋
 ( Back )    Send Money 3 of 3        ( Submit )

Payment Method: Card: ************ 2345    ⟩⟩
  ┌─────────────────────────────────────────┐
  │                                         │
  │         Sending:          $1,000.00 USD │
  │         Associated Send Fees: $33.00 USD│
  │                                         │
  │         Total:            $1,033.00 USD │
  │                                         │
  │ Note: $0.00 USD fee. Free for you,      │
  │ the seller pays the fee.                │
  └─────────────────────────────────────────┘

[Account]    [Send]    [Request]   [Check-in]
```

MOBILE DEVICE DISPLAY CONTENT BASED ON SHAKING THE DEVICE

CROSS REFERENCE TO RELATED APPLICATION

The present application claims priority to U.S. Provisional Pat. Application Ser. No. 61/608,838, filed Mar. 9, 2012, which is incorporated by reference in its entirety.

BACKGROUND

Technical Field

The present invention generally relates to mobile devices, and in particular, to content display on mobile devices.

Related Art

With mobile devices, such as smart phones, being able to perform more and more functions, users are using smart phones more than ever. However, with all the advances and improvements with smart phone capabilities, many users may become frustrated with navigating or progressing through a mobile app to accomplish the desired result due to various reasons, such as the small display size, the small keyboard/keypad, and not understanding what the user needs to do next.

For example, a user can make a payment through the smart phone, which typically requires many steps for the user to go through. At different points in the process, the user may enter information not accepted by the app or not even know what to do next. As a result, the user may simply give up or refuse to use the specific app again.

Therefore, a need exists to help guide the user through problematic stages of a flow on mobile device.

BRIEF DESCRIPTION OF THE DRAWINGS

FIGS. 2A-2E are exemplary screen shots of content provided on a user device in response to the device being shaken;

Wherever possible, the same reference numbers are used throughout the drawings to refer to the same or like elements.

DETAILED DESCRIPTION

According to one embodiment, when a user shakes a mobile device, such as a smart phone, new content is shown on the display of the mobile device. In one embodiment, the content depends on the page or location the user is currently on within the mobile app or mobile browser page. For example, if the user is on a page that is asking the user to select or enter funding source information, the content resulting from shaking the device may be a help page with information about how to select a funding source, possible funding sources, and even advantages/disadvantages of different funding sources. The content may also include frequently asked questions (FAQs) or other information that may be helpful to the user, such as links to send an email, to call, or send feedback.

In other embodiments, the content can depend on other factors or a combination of factors, including, but not limited to the particular page or location in the app, the amount of time the user has been on the particular page or location in the app, the location of the device, the time and/or day, the physical environment detectable by the phone, the state of other applications, such as SMS, notifications, emails, running apps, etc., desired user behavior data, data not on the phone (e.g., in the cloud) that can be accessed remotely, personal identifiable information, user transaction history, etc. The user will then be presented with content, after shaking the device, that is tailored to the situation and/or the user.

However, in one embodiment, the content is the same regardless of any of the factors above. This provides a more simplified analysis, as the same page or content is displayed when the user shakes a device regardless of the user, the device, or page location. In one embodiment, a help/comment screen is displayed any time a user shakes the mobile device. The screen also allows the user to go back to the previous screen if the help/comment screen is not needed. The help/comment screen may include links to send feedback, call a help number, or send an email.

Thus, a user, such as a frustrated or confused user, can easily to get a content display that may enable the user to resolve any issues/questions with the current page or screen.

Figure 1:
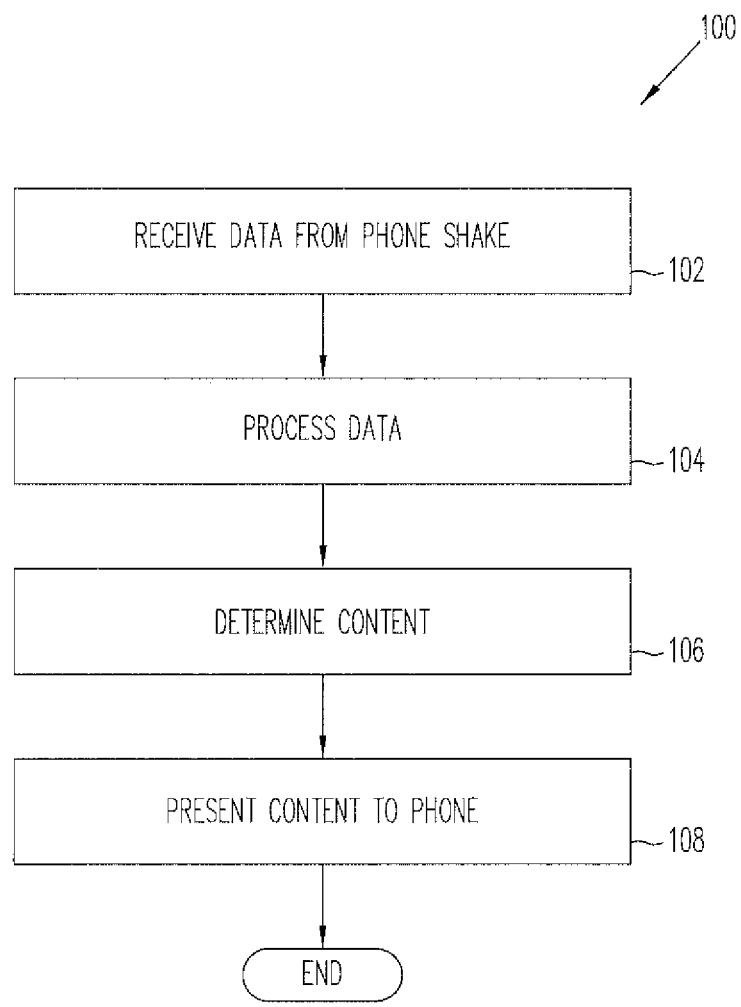
FIG. 1 is a flowchart showing a process for displaying specific content from a user shaking a device according to one embodiment.

FIG. 1 is a flowchart showing a process 100 for displaying specific content from a user shaking a device according to one embodiment. In one embodiment, the device is mobile device, such as a smart phone or a computing tablet. At step 102, a service provider, such as PayPal, Inc. of San Jose, Calif., receives data when a mobile device of a user has been shaken. Other service providers may be any entity that provides content to a user on a device. A user may intentionally shake the mobile device or the mobile device may have been inadvertently shaken or moved. To reduce the chances of the latter, inadvertent shakes may be ignored. For example, gyroscope functions within the mobile device may not initiate a data communication unless certain minimum movements are detected. Also, irregular movements may be ignored, since an intentional shake will have a more predictable movement. Other ways to increase the likelihood that the signal is transmitted only when the user intentionally shakes the device is to have certain functionality turned off unless a specific application or site is opened on the mobile device. The certain functionality would be required to transmit the signal upon detection of device movement or shake. These and other means, alone or in combination, may be employed to reduce the likelihood that the service provider receives data from an unintentional movement of the device.

Thus, the service provider receives data from an intentional shake of the user device. The user may intentionally shake the mobile device due to frustration at a certain page or location of an app on the mobile device. Or, the user may simply shake the device with the intent of receiving helpful content on the mobile device display.

Data received from a shake may simply convey information about the device, such as its phone number or other device ID. Other information may include one or more of the following: content on or about the particular page or location in app the user is viewing when the device is shaken, the amount of time the user has been on the particular page or location in the app when the device is shaken, the location of the device when the device is shaken, the time and/or day when the device is shaken, the physical environment at the time the device is shaken that is detectable by the phone, the state of other applications, such as SMS, notifications, emails, running apps, etc. when the device is shaken, merchant information associated with the app or page the user is viewing, information associated with the user of the device, etc. The type and/or amount or data received may depend on the service or content provider associated with the app or site. More data may result in a more user-specific content display, but may also require more analyzing, processing, and time.

After receiving data from the mobile device, the service provider processes the data at step 104. Processing may include first determining whether the data is intended to be received, i.e., whether it was from an intentional or inadvertent device movement. Even with different ways to minimize unintentional data from being sent, there may still be times when an inadvertent shake transmits data to the service provider. If data received is not what the service provider would expect to receive from an intentional shake, the service provider may ignore the data or send a message, such as by text, asking whether the user intended to shake the device or request certain content. Note that in other embodiments, the service provider may process any data received to determine content to be provided, without processing to determine whether the data was from an intended or unintended device movement.

Once it is determined that the data received was intended, the service provider may further process the data by determining what information/content the user may be interested in based on the information received. For example, a default may be that the user wants general help, which could be indicated by the user shaking the mobile device, regardless of any other data received. However, for a more detailed determination, the system may look at one or more of the information above. For example, if the user is at a payment page and requesting to enter funding source information when the shake occurs, the system may determine that the user wishes help with selecting a funding source. If the user is determined to be an experienced user (e.g., with many transactions), the system may decide the user is seeking help on a more advanced issue, such as selecting multiple funding sources to fund the payment. If the user is inexperienced or new, the system may decide that the user just needs the basic information about how to select a funding source.

In another example, if the user's home account is in California, but the device is in China when the shake occurs, the system may decide that the user may want information about currency conversion for the transaction. In another example, if the user is on an early location of the app, such as a start page, the system may decide that the user wants more information about the app and how to navigate from the start page. As can be seen by those of ordinary skill in the art, there are countless possibilities because there may be so many different combinations of input data that the system processes. In general, the more information the system receives and is able to properly analyze, the better it can determine what the user is seeking from the shake. Again, the content to be provided by the service provider based on the device shake can be user-specific or based only on the content of the page or app the user is on when the device is shaken.

Once the system determines what the user may be seeking, the system determines the content or information to provide to the user device, at step 106. For example, if the determination is that the user is simply seeking an easy way to get help or to provide comment or feedback, the system may determine that content with help/comment information should be presented. In another example, the system may determine that the user may want help with selecting one or more funding sources, how to convert currency, advanced help with a shipping address, introductory information about the app, how to sign in the app, how to change a user setting, etc. Another example is that the new content may differ depending whether the user has been on a page or location for a long time, as opposed to a short time. For the latter, the new content may be a more top level or overview information, while for the former, the content may be more detailed as the user may have spent more time and be more frustrated with the current content.

After the type of content is determined, the system or service provider presents the content to the user on the user mobile device at step 108. The content on the mobile device when the user shook the device is now replaced (or overlayed) with the new content determined at step 106. In one embodiment, the information or content is in context or contextual with the page the user is on. FIGS. 2A-2E are exemplary screen shots of a display on a mobile device, showing different content that may be displayed to the user.

Figure 2B:
Figure 2A:

In FIG. 2A, a general help/comment screen is shown on a mobile device display. After shaking, the user sees a new content or display that gives the user various options to help or commenting, such as a send feedback button, a call button, and an email button. Selecting a desired button directs the user to an appropriate display to continue. For example, tapping or otherwise selecting the "Send Feedback" button may give the user one or more options to provide feedback to the service provider or custodian of the app or site. Options may include a text box to enter text, either by voice or key entry, or a list of feedback the user can choose from, such as from a drop down menu or list. Selecting the "Call" button may automatically dial a customer service number, which when connected, the user may speak to a person with knowledge of the user's situation. Selecting the "Email" button may launch an email application or function, with a "help" email address already populated. The user would then simply need to enter a message and send the email. Note that screen shot in FIG. 2A also includes a "Back" button that allows the user to go back to the previous screen in case the user did not intend to shake the device and see the help/feedback display or that the user does not want to use any of the options on the help/feedback display.

In another example, shown in FIGS. 2B and 2C, a new content is displayed in FIG. 2C after shaking the device from the display shown in FIG. 2B. In FIG. 2B, the user may be looking at the user's account information from a payment provider app or site, and in particular, to recent activity on the user account with the service provider. The service provider may determine, based on the screen content, the user is looking for a description of recent activity or additional information on recent activity associated with the account. FIG. 2C shows one possible new content screen that provides additional information about recent history of the user account. Note that the content or new information is displayed as an overlay to the previous screen instead of completely replacing the previous content. The user may exit the new content by tapping the "done" button or other means, such as tapping an area of the display (e.g., overlying the original content).

Figure 2E:
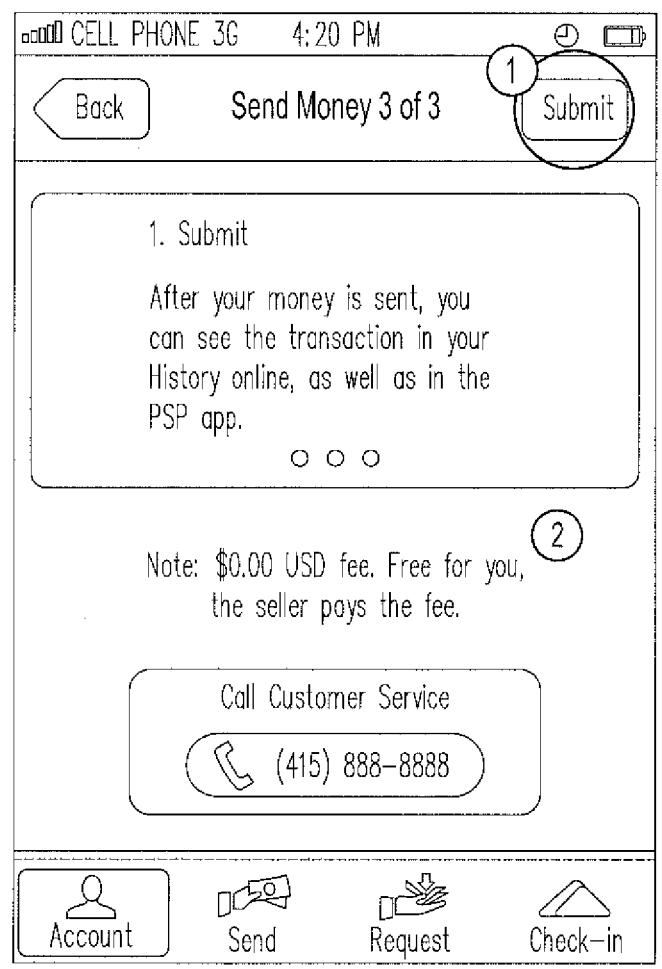

FIGS. 2D and 2E show another example of content display based on a device shake. In FIG. 2D, the user is at a location in a payment provider app for sending money, where the display includes the payment method (e.g., a funding card with last four digits 2345), the amount to be sent ($1000 USD), the service fee ($33 USD), and a total amount to be sent ($1,033 USD), as well as a note about no fee to the buyer, and a "submit" button. Based this screen, the service provider may determine that the user wants more information about what happens when the submit button is selected, how to change a funding source, wants more information about the send fee, wants more information about the note about the seller paying the fee, or wants information about how to change USD to another currency. If the user is a new user, the service provider may determine that the user wants more information about the submit button or what the fee is for. However, if the user is an experienced user, the service provider may determine that the user wants to know how to change currency.

In FIG. 2E, upon shaking the device, the service/content provider may determine that the user wants more information about the "submit" button, which may be due in part to the fact that the user is a new or inexperienced user who has not gone through such a payment flow before with the service provider. As a result, the user is presented with content that provides information about the "submit" button. Note that the content also includes a customer service number to call, which may especially useful for a new user. As with the previous example, the new content is displayed as an overlay to the previous content. The user may exit the new content by tapping on an area of the display showing the previous content or by other means.

Note that the service provider does not need to be a payment provider, but can be virtually any entity associated with a mobile app, including gaming companies, merchants, retailers, etc. Also, one or more steps described herein may be omitted, performed in a different sequence, or combined as desired or appropriate.

Figure 3:
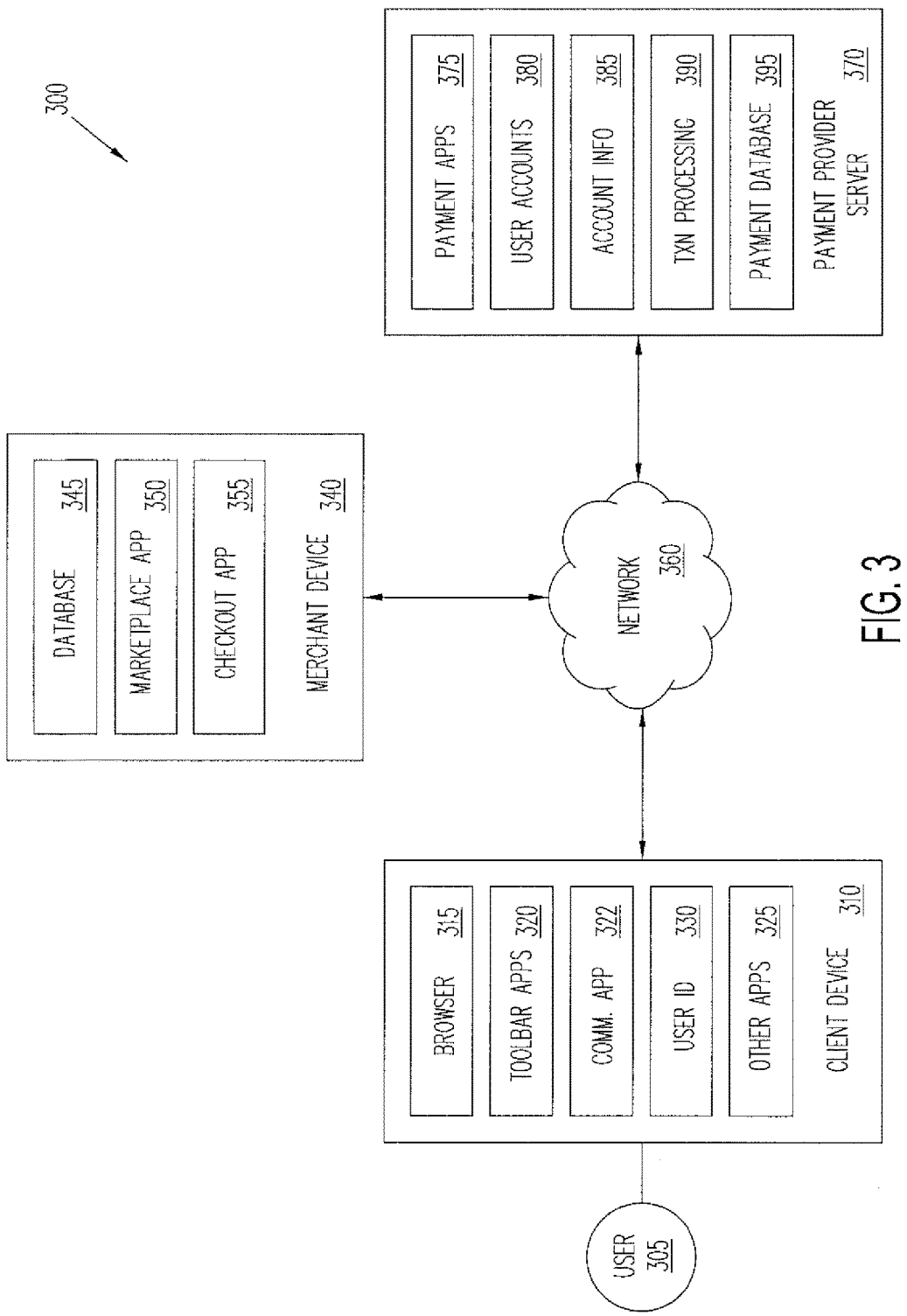
FIG. 3 is an illustration of a system used to process content to display on a user device according to one embodiment.

FIG. 3 is a block diagram of a networked system 300 configured to handle processes, such as described above, in accordance with an embodiment of the invention. System 300 includes a user device 310, a merchant server 340, and a payment provider server 370 in communication over a network 360. Payment provider server 370 may be maintained by a payment provider, such as PayPal, Inc. of San Jose, Calif. A user 305, such as a consumer, utilizes user device 310 to make a purchase transaction facilitated by payment provider server 370, with one or more merchants.

User device 310, merchant server 340, and payment provider server 370 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

Network 360 may be implemented as a single network or a combination of multiple networks. For example, in various embodiments, network 360 may include the Internet or one or more intranets, landline networks, wireless networks, and/or other appropriate types of networks.

User device 310 may be implemented using any appropriate hardware and software configured for wired and/or wireless communication over network 360. For example, in one embodiment, the user device may be implemented as a personal computer (PC), a smart phone, personal digital assistant (PDA), laptop computer, and/or other types of computing devices capable of transmitting and/or receiving data, such as an iPad™ from Apple™.

User device 310 may include one or more browser applications 315 which may be used, for example, to provide a convenient interface to permit user 305 to browse information available over network 360. For example, in one embodiment, browser application 315 may be implemented as a web browser configured to view information available over the Internet or access a website or app of the payment provider. User device 310 may also include one or more toolbar applications 320 which may be used, for example, to provide client-side processing for performing desired tasks in response to operations selected by user 305. In one embodiment, toolbar application 320 may display a user interface in connection with browser application 315.

User device 310 may further include other applications 325 as may be desired in particular embodiments to provide desired features to user device 310. For example, other applications 325 may include security applications for implementing client-side security features, programmatic client applications for interfacing with appropriate application programming interfaces (APIs) over network 360, or other types of applications. Applications 325 may also include email, texting, voice and IM applications that allow user 305 to send and receive emails, calls, texts, and other notifications through network 360. User device 310 includes one or more user identifiers 330 which may be implemented, for example, as operating system registry entries, cookies associated with browser application 315, identifiers associated with hardware of user device 310, or other appropriate identifiers, such as used for payment/user/device authentication or identification. In one embodiment, user identifier 330 may be used by a payment service provider to associate user 305 with a particular account maintained by the payment provider. A communications application 322, with associated interfaces, enables user device 310 to communicate within system 300.

Merchant server 340 may be maintained, for example, by a merchant or seller offering various items, products and/or services through an online site or app. Generally, merchant server 340 may be maintained by anyone or any entity that receives money, which includes charities as well as retailers and restaurants. Merchant server 340 includes a database 345 identifying available products and/or services (e.g., collectively referred to as items) which may be made available for viewing and purchase by user 305. Merchant server 340 also includes a marketplace application 350 which may be configured to serve information over network 360 to browser 315 of user device 310 and/or payment provider server 370, In one embodiment, user 305 may interact with marketplace application 350 to view various items available for purchase from the merchant.

Merchant server 340 also includes a checkout application 355 which may be configured to facilitate the purchase by user 305 of goods or services identified by marketplace application 350. Checkout application 355 may be configured to accept payment information from or on behalf of user 305 through payment service provider server 370 over network 360. For example, checkout application 355 may receive and process a payment confirmation from payment service provider server 370, as well as transmit transaction information to the payment provider and receive information from the payment provider (e.g., a transaction ID). Checkout application 355 may also be configured to accept one or more different funding sources for payment. Merchant server 340 may be in communication with payment provider server 370 and user device 310 so that content presented on user device 310 can be communicated to a content provider (one or more merchants, the payment provider, etc.) when user device 310 is shaken.

Payment provider server 370 may be maintained, for example, by an online payment service provider which may provide payment between user 305 and the operator of merchant server 340. In this regard, payment provider server 370 includes one or more payment applications 375 which may be configured to interact with user device 310 and merchant server 340 over network 360 to facilitate the purchase of goods or services by user 305 of user device 310 as well as search merchant offerings and prices as discussed above.

Payment provider server 370 also maintains a plurality of user accounts 380, each of which may include account information 385 associated with individual users. For example, account information 385 may include private financial information of users of devices such as account numbers, passwords, device identifiers, user names, phone numbers, credit card information, bank information, or other financial information which may be used to facilitate online transactions by user 305. Account information 385 may also include information associated with the payment process described herein. Advantageously, payment application 375 may be configured to interact with merchant server 340 on behalf of user 305 during a transaction with checkout application 355 to handle payments.

A transaction processing application 390, which may be part of payment application 375 or separate, may be configured to receive information from a user device and/or merchant server 340 for processing and storage in a payment database 395 as described above. Transaction processing application 390 may include one or more applications to process information from user 305 and/or the merchant for processing a transaction from user device 310 as described herein. Payment application 375 may be further configured to determine the existence of and to manage accounts for user 305, as well as create new accounts if necessary, such as the set-up, management, and provide various services as described herein.

Figure 4:
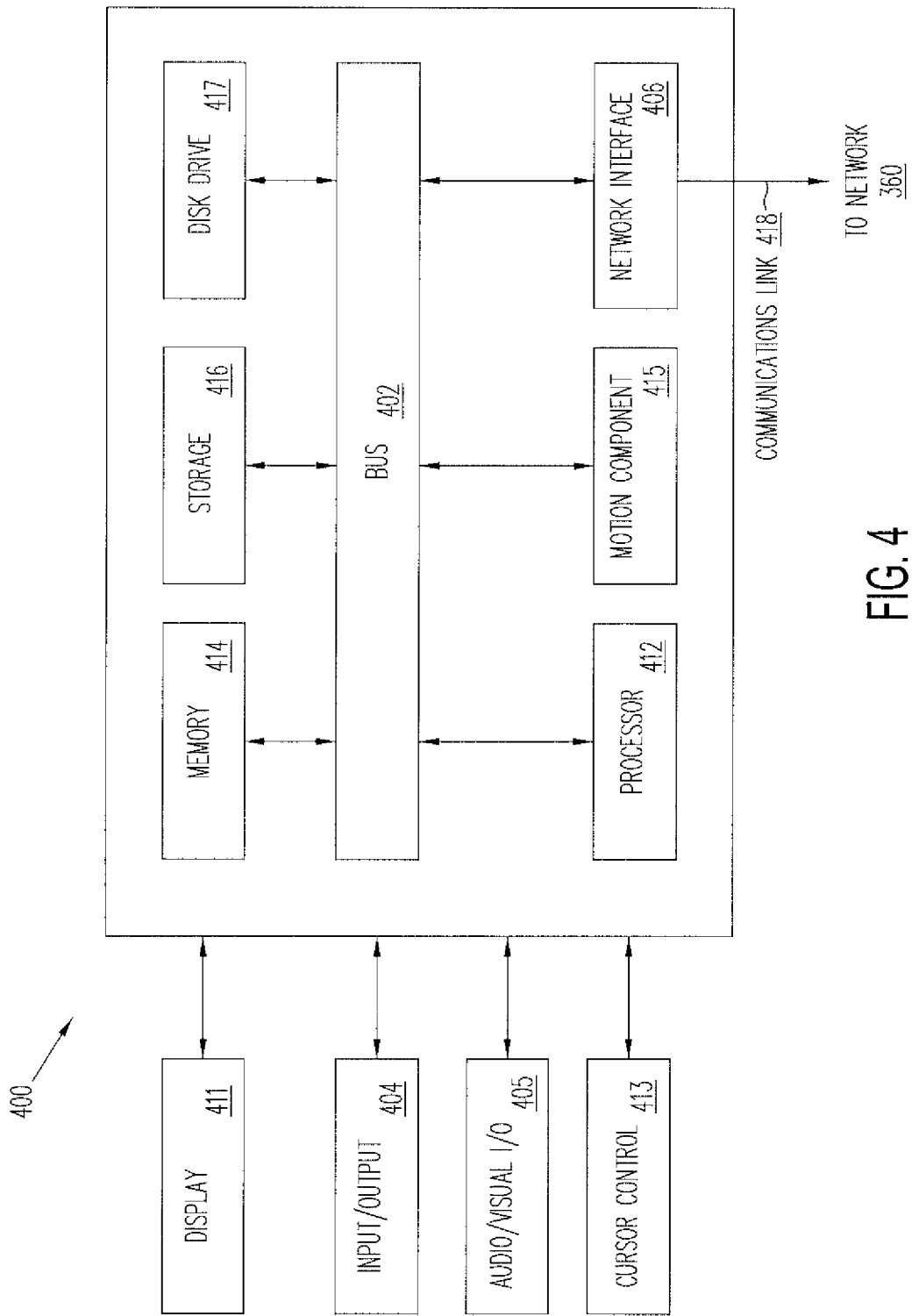
FIG. 4 is a block diagram of a computer system suitable for implementing one or more components in FIG. 3 according to one embodiment of the present disclosure.

FIG. 4 is a block diagram of a computer system 400 suitable for implementing one or more embodiments of the present disclosure. In various implementations, the user device may comprise a personal computing device (e.g., a personal computer, laptop, smart phone, tablet, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). One or more optional audio/video (A/V) input/output (I/O) components 405 may also be included to allow a user to use voice and/or video for inputting information by converting audio signals. A/V I/O component 405 may allow the user to hear audio.

A transceiver or network interface 406 transmits and receives signals between computer system 400 and other devices, such as another user device, a merchant server, or a payment provider server via network 460. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a motion component 415 (e.g., a gyroscope, an accelerometer, and/or other devices used to detect motion), a static storage component 416 (e.g., ROM), and/or a disk drive 417 to store information, such as account information, transaction numbers, machine IDs, and other information described above. Motion component 415 is used to detect when computer system 400 is shaken and sends an indication to processor 412, which can determine whether the shake was intentional or inadvertent (this can also be done with the motion component). Content on display 411 can then be communicated for processing as described herein. Computer system 400 performs specific operations by processor 412 and other components by executing one or more sequences of instructions contained in system memory component 414. Instructions may be performed by one or more processors 412. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more machine readable mediums, including non-transitory machine readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments described herein are exemplary only. One skilled in the art may recognize various alternative embodiments from those specifically disclosed. Those alternative embodiments are also intended to be within the scope of this disclosure. As such, the embodiments are limited only by the following claims.

We claim:

1. A system comprising:
   a non-transitory memory; and
   one or more hardware processors coupled to the non-transitory memory and configured to read instructions from the non-transitory memory to cause the system to perform operations comprising:
      detecting a shake event at a mobile device corresponding to the mobile device being shaken by a user without the user of the mobile device being requested to shake the mobile device;
      identifying the shake event as an intentional shake event based on a detection of an amount of movements of the mobile device;
      responsive to identifying the shake event as an intentional shake event, determining help content to display for an application being utilized when the intentional shake event is identified, based on comparing a location associated with an account corresponding to the user with a geographic location of the mobile device when the intentional shake event is identified; and
      displaying the help content.

2. The system of claim 1, wherein the help content comprises an option to send feedback.

3. The system of claim 1, wherein the help content is further determined based on an experience level of the user with regard to the application being utilized when the intentional shake event is identified.

4. The system of claim 1, wherein the help content is further determined based on an element selected from a group consisting of: an amount of time a first content has been displayed on the mobile device when the intentional shake event is identified, a physical environment of the mobile device at the time the intentional shake event is identified, and a time and/or day when the intentional shake event is identified.

5. The system of claim 1, wherein the help content is further determined based on merchant information associated with a first content displayed on the mobile device at the time the intentional shake event is identified.

6. The system of claim 1, wherein the help content is further determined based on a state of another application running on the mobile device.

7. A method, comprising:
   detecting a shake event corresponding to a mobile device being shaken without the user of the mobile device being requested to shake the mobile device;
   identifying the shake event as an intentional shake event based on a detection of an amount of movements of the mobile device;
   responsive to identifying the shake event as an intentional shake event, determining help content to display based on comparing a location associated with an account corresponding to the user with a geographic location of the mobile device when the intentional shake event is identified; and
   displaying the help content.

8. The method of claim 7, wherein the help content comprises an option to send feedback.

9. The method of claim 7, wherein the help content is further determined based on an experience level of the user with regard to an application being utilized when the intentional shake event is identified.

10. The method of claim 7, wherein the help content is further determined based on an element selected from a group consisting of: an amount of time a first content has been displayed on the mobile device when the intentional shake event is identified, a physical environment of the mobile device at the time the intentional shake event is identified, and a time and/or day when the intentional shake event is identified.

11. The method of claim 7, wherein the help content is further determined based on merchant information associated with a first content displayed on the mobile device when the intentional shake event is identified.

12. A non-transitory machine-readable medium having stored thereon machine-readable instructions executable to cause a machine to perform operations comprising:
   receiving information from a mobile device in response to the mobile device being shaken by a user without the user being requested to shake the mobile device, wherein the information from the mobile device includes a geographic location of the mobile device when the intentional shake event is identified;
   determining that the information was intended to be received;
   in response to determining that the information was intended to be received, determining help content, wherein the help content is determined based on comparing a location associated with an account corresponding to the user with the geographic location of the mobile device when the intentional shake event is identified; and
   providing the help content, in response to the mobile device being shaken, to display on the mobile device without any intervening action by the user.

13. The non-transitory machine-readable medium of claim 12, wherein the help content comprises an option to send feedback.

14. The non-transitory machine-readable medium of claim 12, wherein the help content is further determined based on an experience level of the user with regard to an application being utilized when the intentional shake event is identified.

15. The non-transitory machine-readable medium of claim 12, wherein the help content is further determined based on an element selected from a group of elements consisting of: an amount of time a first content has been displayed on the mobile device when the intentional shake event is identified, a physical environment of the mobile device at the time the intentional shake event is identified, and a time and/or day when the intentional shake event is identified.

16. The non-transitory machine-readable medium of claim 12, wherein the help content is further determined based on merchant information associated with a first content displayed on the mobile device when the intentional shake event is identified.

17. The system of claim 1, wherein the identifying the shake event as an intentional shake event is further based on prompting the user to input whether the shake event was intentional.

* * * * *

UNITED STATES PATENT AND TRADEMARK OFFICE
CERTIFICATE OF CORRECTION

Page 1 of 1

PATENT NO. : 9,639,174 B2
APPLICATION NO. : 13/791697
DATED : May 2, 2017
INVENTOR(S) : Egan Schulz, Peter Chu and Max Edward Metra It is certified that error appears in the above-identified patent and that said Letters Patent is hereby corrected as shown below:

In the Specification

In Column 3, Line 7, change "and/or amount or data received" to --and/or amount of data received--.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*